United States Patent [19]
Sovell

[11] Patent Number: 6,136,377
[45] Date of Patent: Oct. 24, 2000

[54] PLANT COASTER

[75] Inventor: Ronald D. Sovell, Elko, Minn.

[73] Assignee: RPM, Inc., Minneapolis, Minn.

[21] Appl. No.: 09/148,008

[22] Filed: Sep. 4, 1998

Related U.S. Application Data

[60] Provisional application No. 60/058,075, Sep. 5, 1997.
[51] Int. Cl.[7] ........................................................ B05D 3/02
[52] U.S. Cl. .............................. 427/322; 427/393.4; 47/71
[58] Field of Search .............................. 47/71; 427/393.4, 427/322

[56] References Cited

U.S. PATENT DOCUMENTS

| | | | |
|---|---|---|---|
| 357,698 | 2/1887 | Burrough | 47/71 |
| 5,679,145 | 10/1997 | Andersen et al. | 106/162.5 |

OTHER PUBLICATIONS translation of Smit et al, Kunstst. Rubber, (1993), vol. 8, pp. 19–22.

Smit et al, Kunstst. Rubber (1993), 8, pp. 19–22 (Abstract).

*Primary Examiner*—Erma Cameron
*Attorney, Agent, or Firm*—Patterson, Thuente, Skaar & Christensen, P.A.

[57] ABSTRACT

The invention utilizes an absorbent non-woven fabric impregnated on one side with vinyl backing for protecting furniture and floor surfaces from moisture emanating from a potted plant situated upon the invention. The non-woven fabric absorbs and holds the moisture in place and promotes evaporation while the vinyl backing provides a non-skid surface and minimizes scratching, staining and damage to the surface underneath the invention.

6 Claims, 1 Drawing Sheet

PLANT COASTER

This is a utility application based on U.S. Provisional Patent Application No. 60/058,075, filed Sep. 5, 1997.

BACKGROUND OF THE INVENTION

The present invention relates to a new and improved protective plant coaster for potted house plants.

Existing plant coasters are typically made of non-absorbent materials such as plastic, glass, rubber, cork, etc. In addition, common objects such as plates or trays are used. Such devices and materials have significant shortcomings and disadvantages. The two major disadvantages being that some of these types can scratch or mar the table or floor surface it is placed on and secondly that they are of non-absorbent materials. Consequently, spilled or leaking muddy water can overflow and leak onto the table or floor and damage the surface.

SUMMARY OF THE INVENTION

This invention was created to solve the two most important shortcomings of most plant coasters. One being absorbency, the other being protection of surfaces from scratching or water damage.

The invention utilizes an absorbent non-woven fabric impregnated on one side with waterproof vinyl backing for protecting furniture and floor surfaces from moisture emanating from a potted plant situated upon the invention. The non-woven fabric absorbs and holds the moisture in place and promotes evaporation while the vinyl backing provides a protective non-skid surface and prevents soak through which minimizes staining and damage to the surface underneath the invention.

An advantage and feature of the invention is that the plant coasters may be cleaned in a washing machine and also dried in a clothes dryer.

A further advantage and feature of the invention is that moisture from the potted plant may be absorbed and hidden in the fiber mesh.

DETAILED SPECIFICATION

Figure 1:
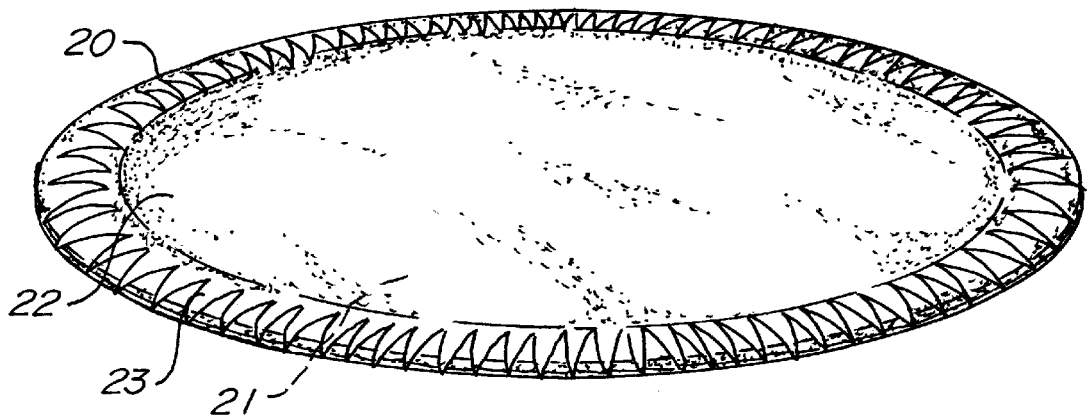
FIG. 1 shows a perspective view of the invention, as viewed from below.
Figure 2:
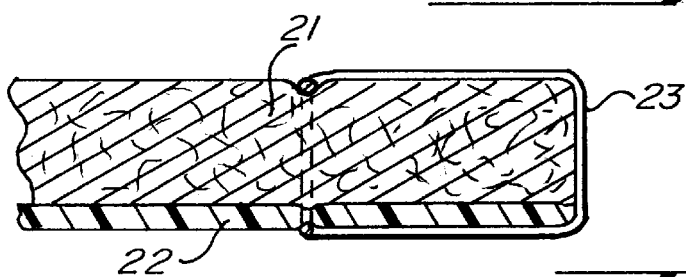
FIG. 2 shows an edge view of the invention.
Figure 3:
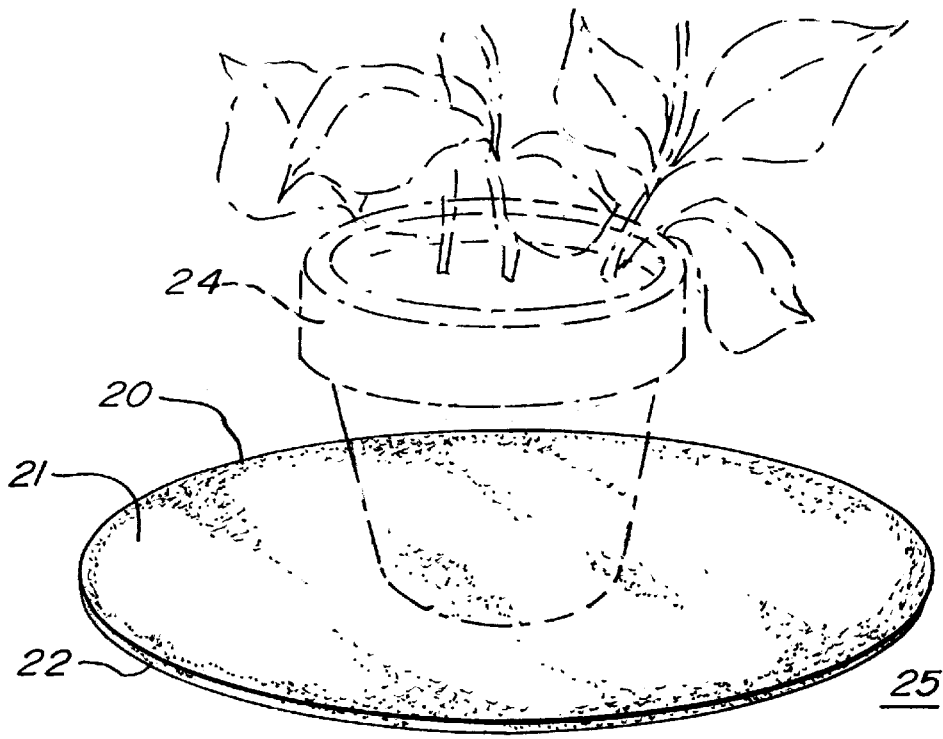
FIG. 3 shows the invention in use with a potted plant illustrated by shadow lines.

Referring to FIGS. 1 and 2, the invention is shown and is generally designated with the numeral 20. The invention principally comprises a non-woven fabric 21 impregnated on a first side and a vinyl backing material 22 bonded to a second side.

The non-woven fabric is suitably formed in a conventional garnet machine that provides a uniform layer of randomly meshed acrylic fibers. The layer is then put into a needle loam which mechanically interlocks by needle punching the fiber into a stabilizing non-woven fabric sheet material.

While in sheet form, non-woven fabric material 21 is coated with vinyl, to yield the vinyl backing material 22 on the second side. The vinyl backing material 22 is cured before further processing. In one embodiment, the vinyl backing material 22 is cured by heat from a gas-fired oven.

The fabric sheet is then cut to the finished size and shape which is circular in the preferred embodiment. Edge stitching 23 provides reinforcement and protection to the finished edge.

The vinyl backing material 22 is waterproof, functions as a moisture barrier for protection of the surface 25 underneath the invention and operates as a non-skid surface. The non-woven fabric 21 is absorbent and is capable of moisture dispersion and accelerating evaporation.

When used as a plant coaster 20, the invention is cut to a circular shape that generally conforms to the shape of the planter pot and is diametrically larger. The larger the diameter of the plant coaster 20 in relation to the plant pot provides sufficient surface area for the absorption, evaporation and dispersion of any accumulated moisture emanating from the plant.

In use, the plant coaster 20 is positioned underneath, and generally concentric with, the potted plant 24. The invention is placed such that a significant portion of the non-woven fabric 21 is exposed to the atmosphere and the vinyl backing material 22 is in contact with the surface 25 to be protected.

Excessive moisture from the potted plant that ordinarily would stain and damage the surface 25 underneath the plant, is suspended in the fibers of the non-woven fabric 21. Normal evaporation will cause said fabric to dry. Vinyl backing material 22 protects the underlying surface 25 from moisture damage.

The fiber material provides an excellent cushioning effect to prevent damage to the surface upon which it is placed as well as providing a moisture absorption capability. The thickness of the coaster in a preferred embodiment is 0.110 to 0.125 inches thick including the vinyl backing. The layer of cured vinyl backing is suitably 0.005 to 0.010 inches thick. The thickness of both the fabric material and vinyl can, of course, be varied.

In one preferred embodiment, the fibers are 100% acrylic. Alternatively, polyester or natural fibers may also be utilized in certain fabric mixes.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of manufacturing plant coasters comprising the steps of:
   a) combining a plurality of fibers in a layer;
   b) needle punching said layer to intertwine said fibers into a non-woven mesh;
   c) applying a flexible impervious to moisture layer of material to one side of the layer of fiber and leaving the other side with the fibers exposed;
   d) cutting the layer to a circular shape with a periphery; and
   e) applying stitching around the circular periphery of the layer of fiber with the impervious material thereon.

2. The method of claim 1 further comprising selecting vinyl as the layer of impervious material.

3. The method of claim 1 further comprising the step of selecting acrylic fibers for combining into a layer.

4. The method of claim 1 further comprising the step of selecting heat curable vinyl as the layer of impervious material and further comprising the step of heat curing said vinyl.

5. The method of claim 1 further comprising the step of selecting a mixture of acrylic fibers and polyester fibers.

6. A method of manufacturing a fiber layer for placement on floor surfaces or furniture for placement of a plant thereon comprising the steps of:

a) combining a plurality of acrylic fibers in a layer with two sides;
b) applying liquid vinyl to only one side of the layer; whereby the fibers on the otherside remain exposed;
c) curing the liquid vinyl;
d) cutting the layer with cured vinyl into a circular shape with a circular periphery; and
e) stitching the periphery.

* * * * *